United States Patent
Upadhyay et al.

(10) Patent No.: US 9,509,646 B1
(45) Date of Patent: *Nov. 29, 2016

(54) INTER-CARRIER COMMUNICATIONS FOR MULTIMEDIA-MESSAGE DELIVERY

(71) Applicant: Sprint Communications Company L.P., Overland Park, KS (US)

(72) Inventors: Piyush Upadhyay, Overland Park, KS (US); Jamie L Kennedy, Olathe, KS (US); William James Routt, Emeryville, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/192,518

(22) Filed: Feb. 27, 2014

Related U.S. Application Data

(63) Continuation of application No. 12/409,573, filed on Mar. 24, 2009, now Pat. No. 8,713,075.

(51) Int. Cl.
| | | |
|---|---|---|
| G06F 17/30 | (2006.01) | |
| G06F 7/00 | (2006.01) | |
| H04L 12/58 | (2006.01) | |
| H04W 4/12 | (2009.01) | |

(52) U.S. Cl.
CPC .............. *H04L 51/066* (2013.01); *H04W 4/12* (2013.01)

(58) Field of Classification Search
CPC .................................................... H04L 51/066
See application file for complete search history.

(56) References Cited

U.S. PATENT DOCUMENTS

| | | | |
|---|---|---|---|
| 7,447,219 B2 * | 11/2008 | Meisl et al. ................. | 370/401 |
| 7,603,106 B2 | 10/2009 | Aaltonen et al. | |
| 7,616,739 B2 * | 11/2009 | Tang et al. ................. | 379/88.13 |
| 7,733,887 B2 * | 6/2010 | Meisl et al. ................. | 370/401 |
| 8,200,259 B2 * | 6/2012 | Kupsh et al. ................. | 455/466 |
| 8,675,831 B2 * | 3/2014 | Cai et al. ................... | 379/88.13 |
| 2004/0111476 A1 | 6/2004 | Trossen et al. | |
| 2005/0181766 A1 * | 8/2005 | Rooke et al. .............. | 455/412.1 |
| 2005/0235048 A1 | 10/2005 | Costa-Requena et al. | |
| 2006/0029192 A1 | 2/2006 | Dudley et al. | |
| 2006/0224684 A1 | 10/2006 | Miedema et al. | |

(Continued)

OTHER PUBLICATIONS

T Mobile, "Multimedia Messaging Service (MMS)", Jan. 28, 2009, Available at: http://support.t-mobile.com/knowbase/root/public/tm21396.htm.
3G—3RD Generation Partnership Project 2 3GPP2, "Multimedia Messaging Service; MM4 Stage 3 Inter-carrier Interworking", Jan. 2006.
Non Final Office Action mailed May 16, 2011 in U.S. Appl. No. 12/409,573.

(Continued)

*Primary Examiner* — Jeffrey A Burke

(57) ABSTRACT

A method, system, and medium are provided for causing a first multimedia messaging service center (MMSC) on a home network to communicate a multimedia messaging service (MMS) message to a second MMSC on a foreign network, the MMS message being modified to conform to multimedia-messaging parameters of a recipient mobile device. A query is issued by the first MMSC to the second MMSC to obtain one or more multimedia-messaging parameters of the recipient mobile device. The parameters include characteristics of the recipient mobile device and subscription details as well as parameters set by the foreign network. The first MMSC modifies the MMS message to conform to the parameters and communicates the modified MMS message to the second MMSC. The second MMSC delivers the MMS message to the recipient or provides a failed-delivery notification to the first MMSC. A reason for the failed delivery might also be indicated.

13 Claims, 5 Drawing Sheets

(56) References Cited

U.S. PATENT DOCUMENTS

2007/0171938 A1 7/2007 Sohn et al.
2008/0147592 A1 6/2008 Nandiwada et al.
2009/0104922 A1 4/2009 Dudley et al.
2010/0075699 A1 3/2010 Kupsh et al.

OTHER PUBLICATIONS

Final Office Action mailed Sep. 26, 2011 in U.S. Appl. No. 12/409,573.
Notice of Allowance mailed Dec. 13, 2013 in U.S. Appl. No. 12/409,573.

* cited by examiner

INTER-CARRIER COMMUNICATIONS FOR MULTIMEDIA-MESSAGE DELIVERY

PRIORITY

This is a continuation of U.S. application Ser. No. 12/409,573, filed 24 Mar. 2009, entitled "INTER-CARRIER COMMUNICATIONS FOR MULTIMEDIA-MESSAGE DELIVERY," which is hereby incorporated by reference in its entirety.

SUMMARY

Embodiments of the invention are defined by the claims below, not this summary. A high-level overview of various embodiments of the invention are provided here for that reason, to provide an overview of the detailed description, and to introduce a selection of concepts that are further described below. This summary is not intended to identify key features or essential features of the claimed subject matter, nor is it intended to be used as an aid in isolation to determine the scope of the claimed subject matter.

Embodiments of the invention include computer-readable media, systems, and methods for causing a multimedia messaging service (MMS) message to be delivered from a first multimedia messaging service center (MMSC) on a home network to a second MMSC on a foreign network. The first MMSC queries the second MMSC to obtain multimedia-messaging parameters of a recipient mobile device to which the MMS message is addressed. The second MMSC queries its own systems and responds to the first MMSC with the multimedia-messaging parameters. Thereby, the first MMSC can modify the MMS message and any multimedia content contained therein to conform to the multimedia-messaging parameters of the recipient mobile device. The MMS message is then communicated to the second MMSC for delivery to the recipient mobile device. In the event that the second MMSC is unable to deliver the MMS message to the recipient mobile device a failed-delivery notification is provided to the first MMSC which in turn may provide a similar notification to a user's mobile device.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

Figure 1:
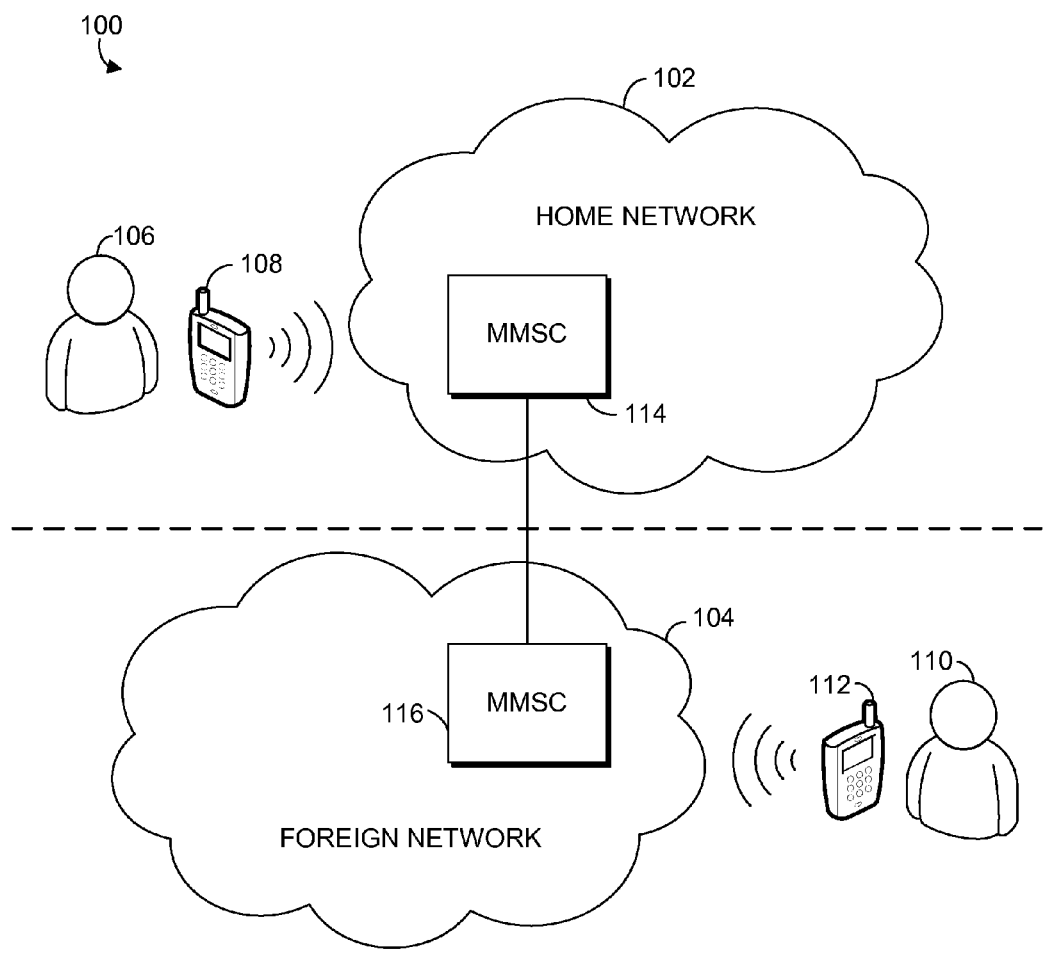
FIG. 1 is a block diagram of an exemplary wireless-network environment suitable for use in implementing embodiments of the invention.

The subject matter of embodiments of the invention is described with specificity herein to meet statutory requirements. However, the description itself is not intended to necessarily limit the scope of claims. Rather, the claimed subject matter might be embodied in other ways to include different steps or combinations of steps similar to the ones described in this patent, in conjunction with other present or future technologies. Terms should not be interpreted as implying any particular order among or between various steps unless and except when the order of individual steps is explicitly described.

Throughout this patent, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments of the invention. The following is a list of these acronyms:

PDA Personal Data Assistant
MMS Multimedia Messaging Service
MMSC Multimedia Messaging Service Center
MDN Mobile Device Number
NAI Network Address Identifier
MSID Mobile System Identification
3GPP Third Generation Partnership Project
WAP Wireless Application Protocol
GPRS General Packet Radio Service
MM1 Multimedia 1—MMS Protocol Suite
MM4 Multimedia 4—MMS Protocol Suite
ENUM E.164 NUmber Mapping
HTTP Hypertext Transfer Protocol Further, various technical terms are used throughout this description. An illustrative resource that fleshes out various aspects of these terms can be found in Newton's Telecom Dictionary by H. Newton, 24th Edition (2008).

Embodiments of the invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, random-access memory (RAM), read-only memory (ROM), electrically erasable programmable read-only memory (EEPROM), flash memory or other memory technology, compact-disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

In an embodiment, computer-readable media having computer-executable instructions embodied thereon that, when executed, cause a computing device of a first network to perform a method for delivering a multimedia message to a second computing device of a second network is described. The second computing device is queried for multimedia-messaging parameters of a recipient. The multimedia message is addressed for delivery to the recipient. The multimedia-messaging parameters are received. The multimedia message and a multimedia object contained in the multimedia message are modified to conform to the multimedia-messaging parameters. A modified multimedia message is communicated to the second computing device.

In another embodiment, a system for delivering a multimedia message from a user of a first network to a recipient on a second network is described. The system includes a message-receiving component, a querying component, a modifying component, and a communicating component. The message-receiving component is configured to receive an outgoing multimedia message from a user. The outgoing multimedia message is addressed for delivery to the recipient on the second network. The querying component is configured to query an MMSC of the second network for multimedia-messaging parameters of the recipient. The modifying component is configured to modify the outgoing message and multimedia objects contained in the multimedia message to conform to the multimedia-messaging parameters. The communicating component is configured to communicate a modified multimedia message to the MMSC of the second network for delivery to the recipient.

In another embodiment, a computer-implemented method for delivering a multimedia messaging service (MMS) message from a first multimedia messaging service center (MMSC) to a second MMSC at a foreign network is described. An MMS message is received from a user at a first MMSC. The user and the first MMSC are on a home network and the MMS message is addressed to a recipient. The recipient is determined to be on a foreign network. A second MMSC on the foreign network is queried for multimedia-messaging parameters for the recipient. The multimedia-messaging parameters include parameters of the foreign network, the recipient's subscription parameters, and the recipient's mobile device parameters. The multimedia-messaging parameters are received from the second MMSC. The MMS message and multimedia objects contained therein are modified to conform to the multimedia-messaging parameters. A modified MMS message is communicated to the second MMSC for delivery to the recipient.

Referring initially to FIG. 1 a block diagram of an exemplary wireless-network environment suitable for use in implementing embodiments of the invention is generally designated as numeral 100. The environment 100 includes a home network 102 and a foreign network 104. The home network 102 and foreign network 104 are any wireless-telecommunications networks capable of receiving, processing, and delivering multimedia messaging service (MMS) messages. The home network 102 and foreign network 104 as described herein are only differentiated to indicate that they are separate wireless-telecommunications networks and thus, serve separate client bases. As such, the home network 102 provides wireless-communications service to a user 106 having a mobile device 108, and the foreign network 104 provides service to a recipient 110 having a mobile device 112. The mobile devices 108 and 112 are any available mobile device capable of sending and receiving multimedia messages such as MMS messages. The mobile devices 108 and 112 include, for example and not limitation, a wireless phone, a personal data assistant (PDA), a Blackberry® device, a wireless enabled media player, or other wireless-communications enabled devices.

Throughout this discussion a user, a recipient, and their respective mobile devices, such as the user 106, recipient 110, and the mobile devices 108 and 112, are referred to as subscribed to a network. Such a description is intended to indicate that wireless-telecommunications services are provided to the user, recipient, and mobile devices by a respective network. The user, recipient, and mobile devices may have a subscription agreement with the respective network, but such is not necessary. Various subscription agreements and service contract options are available in the art, such as for example, annual contracts, pay-per-minute plans, and pre-paid accounts, among others. Any such agreement, contract, or service plan is suitable for use in embodiments of the invention. Further, a home network is descriptive of a wireless-telecommunications network, or carrier that provides wireless-telecommunications service to a user, such as the user 106. A foreign network is any wireless-telecommunications network or carrier that is not the home network.

Multimedia messaging service (MMS) is a telecommunications standard for sending and receiving messages that may include text, rich text, images, audio, video, or other data. MMS may utilize Third Generation Partnership Project (3GPP) and wireless application protocol (WAP) standards as well as general packet radio service (GPRS), among other wireless-network technologies to communicate multimedia messages from a user to a recipient mobile device. MMS messages are typically composed, sent, and received from a mobile device, such as the mobile devices 108 and 112. Other forms of messages, such as an email, may be composed and sent from computing devices, such as a personal computer, and then communicated to a recipient mobile device as an MMS message.

An MMS message is created by the user by any available methods and may include one or more component multimedia objects in a single message. For example, a user composes an MMS message by first capturing an image with a camera-enabled mobile device and then composing a message having the captured image included therein via one or more software applications on the mobile device. MMS messages might also be created which include an audio or video file recorded by the mobile device or received or obtained from another source, among other forms of media. The creation process for an MMS message also includes identifying a recipient. Such a recipient may be identified by an associated mobile device number (MDN), a network address identifier (NAI), a mobile station identification (MSID), or an email address, among others.

The environment 100 also includes a multimedia messaging service center (MMSC) 114 on the home network 102 and an MMSC 116 on the foreign network 104. An MMSC 114, 116 is a computing device or group of computing devices and components used by the wireless-telecommunications networks 102, 104 to receive, process, and deliver multimedia messages, such as for example an MMS message, from the user 106, to the recipient 110. The MMSC 114 receives multimedia messages from the mobile device 108 via home network 102. The MMSC 114 is configured to communicate the multimedia message to the MMSC 116 of the foreign network 104. The MMSC 116 is configured to deliver the multimedia message to the mobile device 112 via the foreign network 104.

The home network 102 and the foreign network 104 include various components necessary for implementing wireless communications such as, for example and not limitation, base stations, switches, routers, servers, and resource locators, among others, which are not shown in FIG. 1. Such is not intended to indicate the inclusion or exclusion of such components from the home network 102 or the foreign network 104. The depiction of FIG. 1 is presented in a simplified form for clarity and to indicate only the most pertinent components for implementations of embodiments of the invention.

Figure 2:
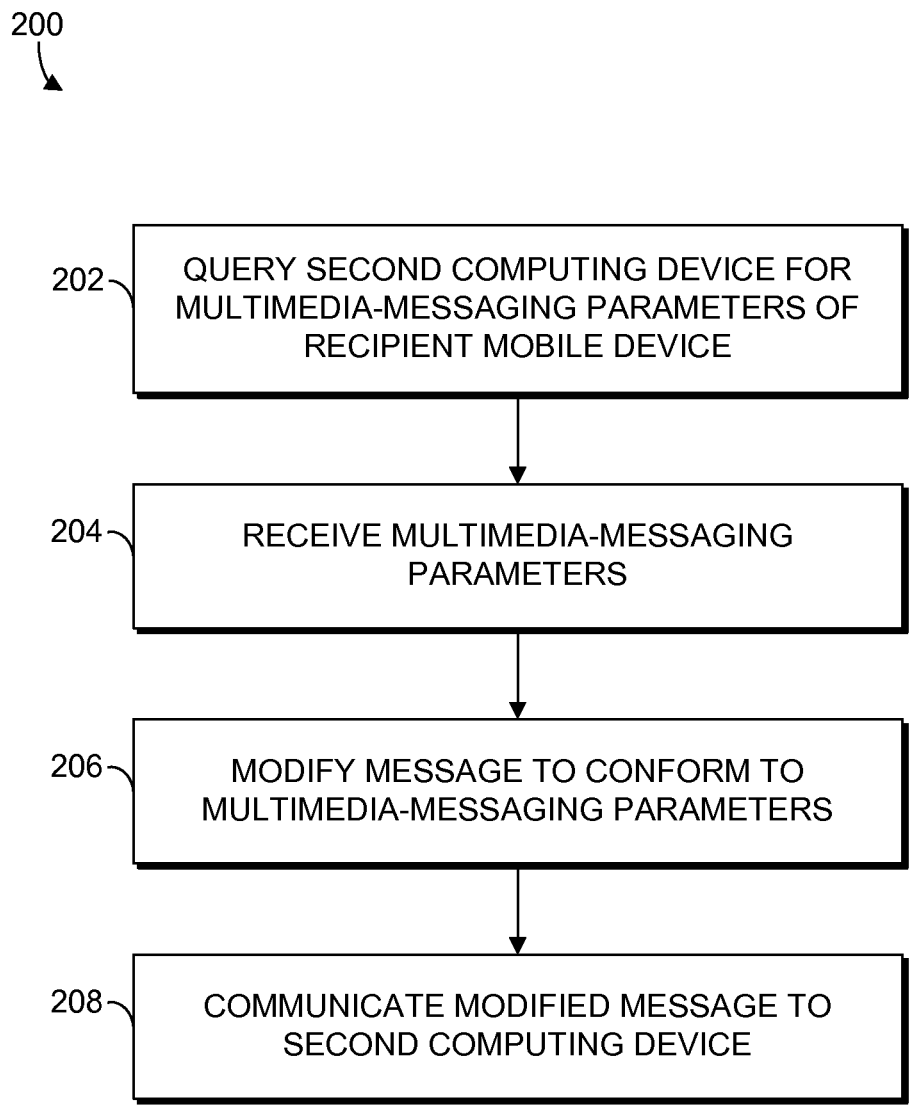
FIG. 2 is a flow diagram depicting a method for delivering a multimedia message from a first computing device of a home network to a second computing device of a foreign network in accordance with embodiments of the invention.

With reference now to FIG. 2 a flow diagram depicting a method 200 for delivering a multimedia message from a first MMSC of a home network to a second MMSC of a foreign network is described in accordance with embodiments of the invention. Preliminarily, a multimedia message is composed by a user on a mobile device. In an embodiment, the multimedia message is an MMS message. The multimedia message is communicated to a first MMSC on a home network. The communication of the multimedia message to the first MMSC may employ and comply with any standards, protocols, and interfaces designated for such communications, such as for example and not limitation, Multimedia 1 (MM1) of the MMS protocol suite.

As indicated by block 202, the first MMSC queries a second MMSC, the second MMSC being on a foreign network, for one or more multimedia-messaging parameters of a recipient's mobile device. The query and any other communications between the first MMSC and the second MMSC employ any available standards, protocols, and interfaces, such as for example and not limitation, Multimedia 4 (MM4) of the MMS protocol suite. In an embodiment, an extension of the MM4 protocol is utilized for communications between the first and second MMSCs.

Multimedia-messaging parameters, hereinafter "parameters," include any characteristics of a recipient's mobile device that might indicate the device's capabilities for handling, processing, or displaying MMS messages. Such characteristics include, for example and not limitation, file types, file sizes, applications, display sizes, and display resolutions that are compatible with the mobile device and its capabilities. Parameters also include any characteristics of the foreign network that affect the processing, handling, or delivery of multimedia messages to the recipient's mobile device. Such characteristics include maximum file size limitations, and file type restrictions, among others. Additionally, the parameters include any characteristics and limitations based on a recipient's subscription, service agreement, or service plan with the foreign network. For example, the recipient may subscribe to a service plan that limits the amount of data that may be transferred during a given period of time. As such, a multimedia message exceeding that limited amount of data, or causing a total amount of data transfer for the given period of time to exceed the limit would not be deliverable.

The parameters are received by the first MMSC as indicated at block 204. The parameters are used by the first MMSC to determine if the user's multimedia message conforms to the parameters. As the multimedia message may include one or more multimedia objects, each of the individual objects as well as the multimedia message as a whole are analyzed by the first MMSC for conformance with the parameters. Where one or more multimedia objects in the multimedia message or the multimedia message itself do not conform to the parameters, the first MMSC modifies the multimedia message or the multimedia objects, as depicted at block 206. The first MMSC modifies the multimedia message and multimedia objects by any available method, such as for example transcoding, changing a file type, applying a compression, and reformatting, among others.

Having modified the multimedia message to conform to the parameters of the recipient's mobile device, the foreign network, and the recipient's subscription agreement, the first MMSC communicates the modified multimedia message to the second MMSC for delivery to the recipient's mobile device, as indicated at 208. As described previously, the communications between the first and second MMSCs follow any necessary protocols, standards, and interfaces. In an embodiment, the communications are in accordance with an extension to the MM4 protocol of the MMS protocol suite.

Figure 3:
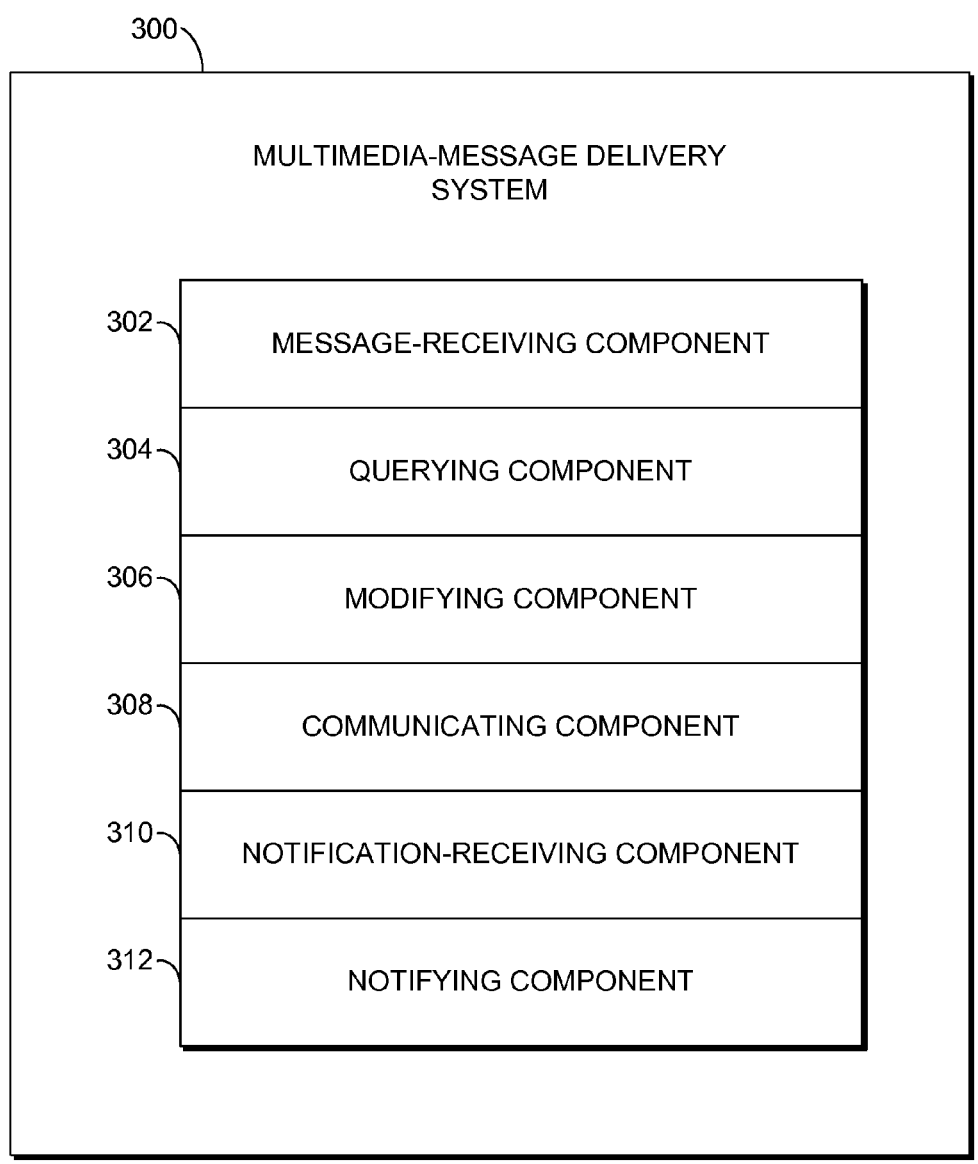
FIG. 3 is a block diagram depicting a system for delivering a multimedia message from a user of a home network to a recipient mobile device on a foreign network in accordance with embodiments of the invention.

With reference now to FIG. 3, a block diagram depicting a multimedia-message delivery system 300 for delivering a multimedia message from a mobile device of a home network to a recipient mobile device on a foreign network is described in accordance with embodiments of the invention. The multimedia-message delivery system 300 is part of a home network and includes a plurality of components configured to carry out steps or processes for delivery of a multimedia-message in accordance with embodiments of the invention. Such components include a message-receiving component 302, a querying component 304, a modifying component 306, a communicating component 308, a notification-receiving component 310, and a notification component 312. The message-receiving component 302 receives an outgoing multimedia message from a mobile device subscribed to the home network. In an embodiment, the multimedia message is an MMS message. The outgoing multimedia message is addressed to a recipient mobile device that is not subscribed to the home network, but rather is subscribed to a foreign network. In an embodiment, the message-receiving component 302 receives the outgoing message following MM1 protocol.

The querying component 304 provides a query to an MMSC on the foreign network to obtain one or more parameters of the recipient mobile device and subscription, as well as any parameters provided by the foreign network. The querying component 304 also receives a communication from the MMSC on the foreign network in response to the query indicating such parameters for the recipient mobile device. In an embodiment, the querying component 304 employs MM4 protocols and an extension thereto to communicate with the MMSC on the foreign network.

The modifying component 306 employs the parameters of the recipient mobile device to determine whether the outgoing multimedia message conforms therewith. If the outgoing message does not conform to the parameters, the modifying component 306 appropriately modifies the message using any desired method, as described previously. Where the outgoing message conforms to the parameters then the modifying component 306 need not provide any modifications.

The communicating component 308 is configured to communicate the outgoing message, whether modified or not, to the MMSC on the foreign network for delivery to the recipient mobile device. The communicating component 308 might also utilize MM4 protocols and/or an extension thereof to communicate with the MMSC.

In the instance that the MMSC on the foreign network is unable to deliver the multimedia-message to the recipient mobile device, the notification-receiving component 310 receives a failed-delivery notification from the MMSC. The failed-delivery notification uses any suitable format, file type, standards, protocols, or other characteristics for communicating an indication that the multimedia-message was not successfully delivered. In an embodiment, the MMSC communicates the failed-delivery notification to the notification-receiving component 310 via MM4 protocol or an extension thereto. In yet another embodiment, the failed-delivery notification includes a reason for the failed delivery. The reason may be indicated specifically or generally and may be described by a code, such as a hypertext transfer protocol (HTTP) status code, by a text description, or in any other available manner.

Upon receipt of such a failed-delivery notification the notifying component 312 provides a similar notification to the message originating mobile device to indicate the failed delivery. The notification is provide to the mobile device in any available manner and where a reason for the failed delivery is received from the MMSC such may also be indicated to the mobile device. In an embodiment, a successful delivery notification is received from the MMSC by the notification-receiving component 310 and a similar notification is provided to the mobile device by the notification component 312.

Figure 4:
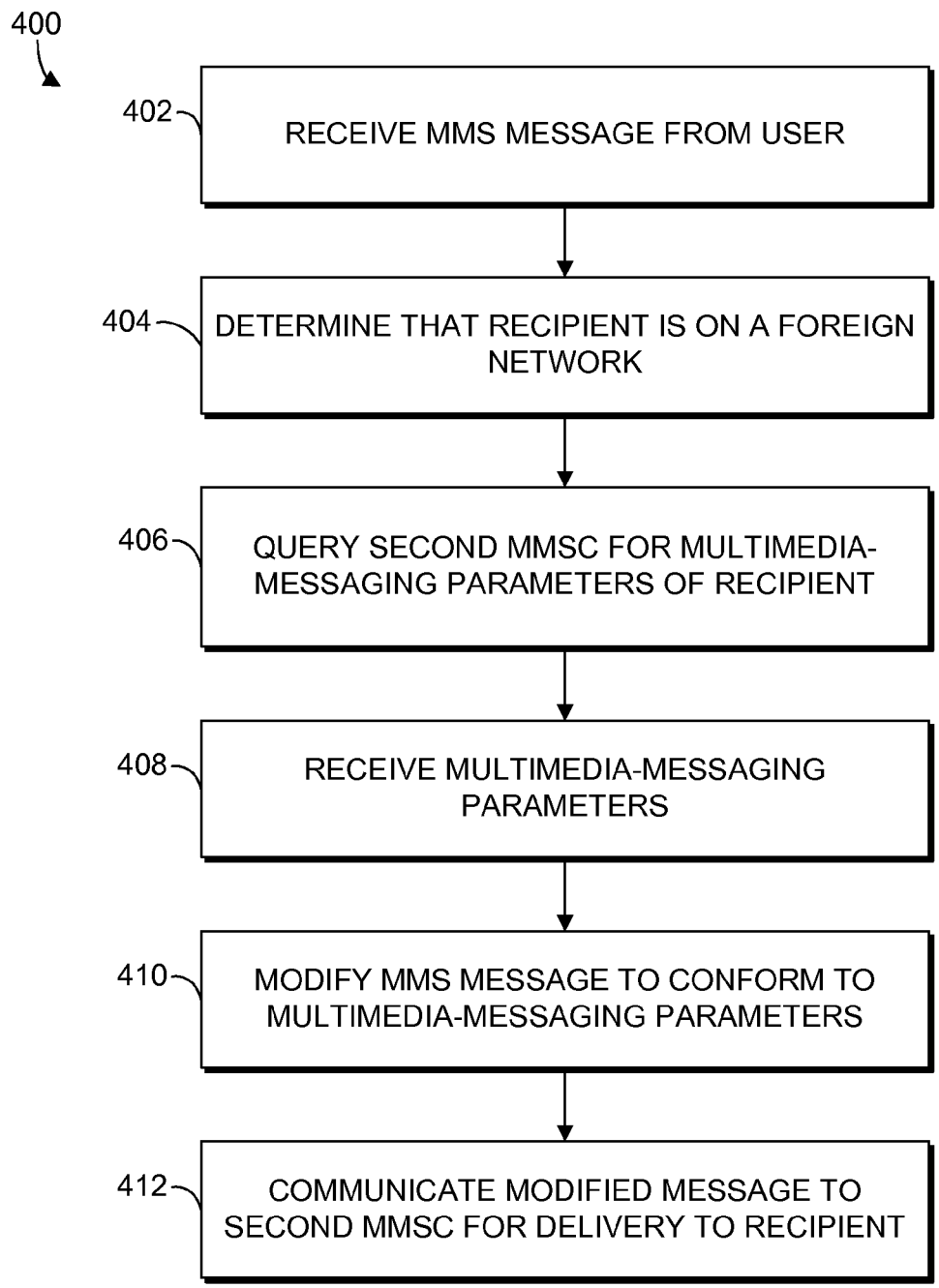
FIG. 4 is a flow diagram depicting a method for delivering a multimedia messaging service message from a first multimedia messaging service center to a second multimedia messaging service center at a foreign network in accordance with embodiments of the invention.

Referring now to FIG. 4, a flow diagram depicting method 400 for delivering an MMS message from a first MMSC to a second MMSC at a foreign network in accordance with embodiments of the invention is described. An MMS message addressed to a recipient mobile device is received from a user by the first MMSC, as indicated at 402. The user is subscribed to a home network that includes the first MMSC. As described above, the MMS message may include text, rich text, images, video, audio, or other data.

At 404, the first MMSC determines if the recipient mobile device is a subscriber to the home network. The first MMSC employs any available technique or steps to determine if the recipient mobile device is subscribed to the home network and if not, to determine a foreign network to which the recipient mobile device is subscribed. In an embodiment, the first MMSC queries a database that is internal to the home network and contains data on all users subscribed to the home network. The first MMSC might use the recipient mobile device's mobile device number (MDN) or other address information to parse the query to the internal database. If the first MMSC determines that the recipient is not a subscriber of the home network then the first MMSC might issue a second query to another database, either internal or external to the home network to identify the foreign network to which the recipient mobile device is subscribed. In an embodiment, the first MMSC utilizes a telephone number mapping protocol, such as E.164 number mapping (ENUM) to identify the network for the receipt mobile device.

Having identified the recipient mobile device as subscribed to a foreign network, the first MMSC issues a query to a second MMSC at the appropriate foreign network to obtain one or more multimedia-messaging parameters for the recipient mobile device, as indicated at 406. As described above, the multimedia-messaging parameters include characteristics and capabilities of the recipient mobile device, the foreign network, and the recipient's subscription details. The parameters are received by the first MMSC from the second MMSC, as described at 408. The first MMSC identifies any non-conformance of the MMS message and its component objects, and modifies the MMS message and its component objects to cure the nonconformities, as described previously and indicated at 410. At 412, the first MMSC communicates the modified MMS message to the second MMSC for delivery to the recipient mobile device.

Figure 5:
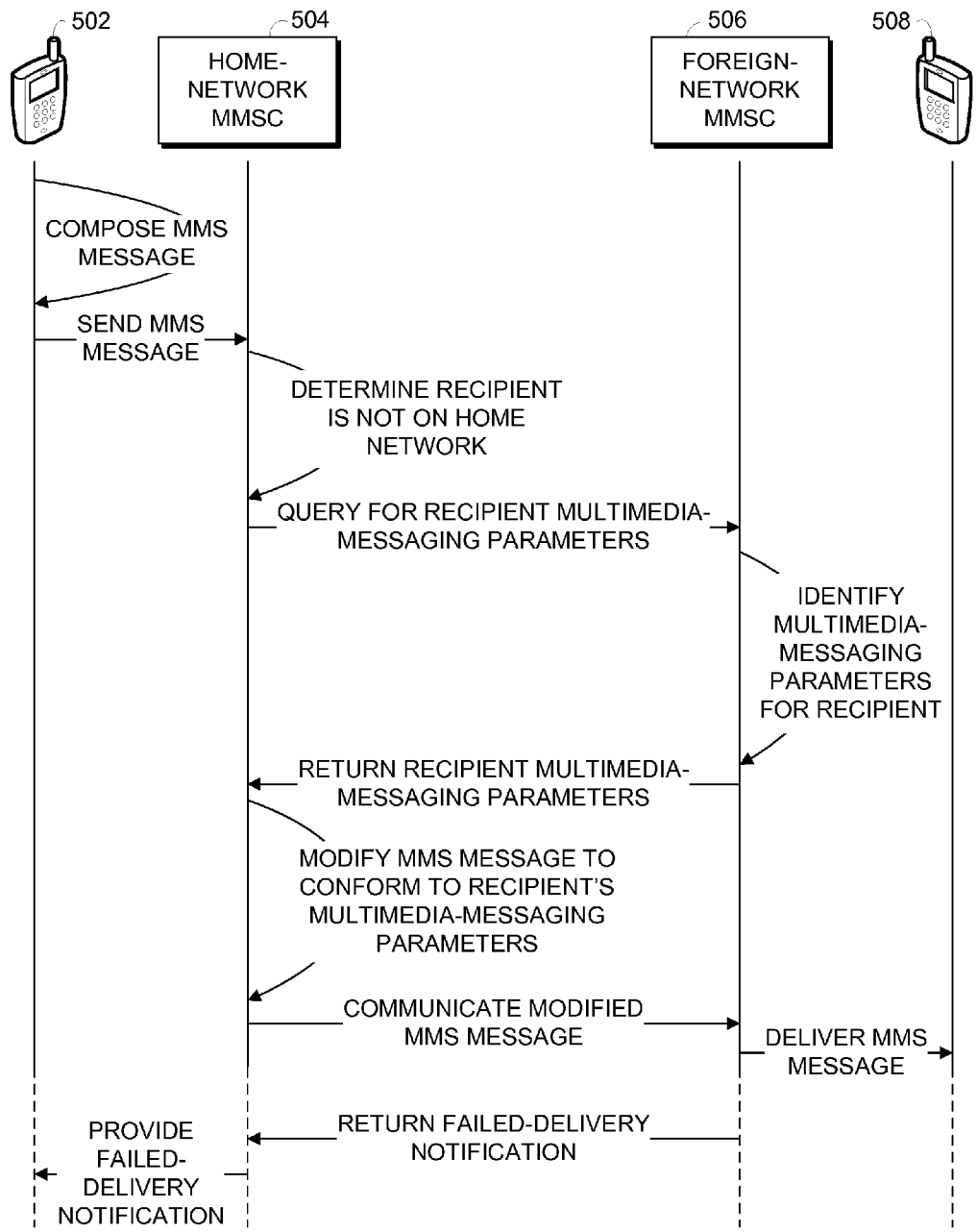
FIG. 5 is a flow diagram depicting a method for delivering a multimedia messaging service message from a user's mobile device on a home network to a recipient's mobile device on a foreign network in accordance with embodiments of the invention.

With reference now to FIG. 5, a flow diagram depicting an exemplary embodiment of a method for delivering an MMS message from a user's mobile device 502 on a home-network to a recipient's mobile device 508 on a foreign network is described. A user first composes an MMS message on a mobile device 502. The MMS message contains one or more multimedia objects and is addressed to a recipient's mobile device 508. The user sends the MMS message by, for example, pressing a send key on the mobile device 502. The systems of the home network receive the MMS message and route the message to a home-network MMSC 504. The home-network MMSC 504 determines that the recipient is not subscribed to the home network. The home-network MMSC 504 queries a foreign-network MMSC 506 for one or more multimedia-messaging parameters of the recipient's mobile device 508.

The foreign-network MMSC 506 issues one or more queries to databases on the foreign network to identify any multimedia-messaging parameters for the recipient's mobile device 508. The databases on the foreign network contain details regarding the recipient's mobile device characteristics as well as the recipient's subscriber information. The foreign-network MMSC 506 also identifies any multimedia-messaging parameters set by the foreign network. The identified multimedia-messaging parameters are then provided to the home-network MMSC 504.

The home-network MMSC 504 uses the parameters to determine whether the MMS message and its component multimedia objects conform thereto, and if not, the home-network MMSC 504 modifies the MMS message and its component objects to provide conformance. The home-network MMSC 504 communicates the conforming MMS message to the foreign-network MMSC 506 for delivery to the recipient's mobile device 508.

The foreign-network MMSC 506 delivers the conforming MMS message to the recipient's mobile device 508. Alternatively, if the foreign-network MMSC 506 is unable to deliver the MMS message to the recipient's mobile device 508 or if delivery fails, the foreign-network MMSC 506 communicates a failed-delivery notification to the home-network MMSC 504. An MMS message might be undeliverable where the recipient's mobile device 508 is powered off, is not accepting MMS messages, has exceeded its memory capacity, or network conditions make delivery impossible, among other reasons.

The failed-delivery notification indicates to the home-network MMSC 504 that the delivery of the MMS message to the recipient's mobile device 508 was not successful, and may also indicate a reason for such failure. The failure reason might be identified specifically or a general failure description might be provided.

The home-network MMSC 504 provides a notification to the user's mobile device 502 indicating that the MMS message delivery to the recipient's mobile device 508 failed. The home-network MMSC 504 might also provide the reason for the failed delivery to the user's mobile device 502 where such is provided by the foreign-network MMSC 506. In an embodiment, the home-network MMSC 504 provides subsequent delivery attempts to deliver the MMS message when a failed-delivery notification is received.

Many different arrangements of the various components depicted, as well as components not shown, are possible without departing from the scope of the claims below. Embodiments of our technology have been described with the intent to be illustrative rather than restrictive. Alternative embodiments will become apparent readers of this patent after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for delivering a multimedia messaging service (MMS) message from a first multimedia messaging service center (MMSC) of a home network to a second MMSC of a foreign network, the method comprising:
   modifying, at the first MMSC, one or more of the MMS message and one or more multimedia objects contained in the MMS message to conform to the one or more multimedia-messaging parameters to provide a modified multimedia message;
   communicating the modified MMS message to a second MMSC for delivery to a recipient's mobile device;
   receiving a first failed-delivery notification from the second MMSC when the modified MMS message cannot be delivered to the recipient's mobile device; and
   communicating a second failed-delivery notification to a user's mobile device, wherein the first or second failed-delivery notifications include a condition associated with the foreign network or the recipient's mobile device and the condition is one of: the recipient's mobile device is powered off, the recipient's mobile device is not accepting MMS messages, the recipient's mobile device has exceeded its memory capacity, or the foreign network conditions make delivery impossible.

2. The computer-implemented method of claim 1, wherein modifying the one or more of the MMS message further comprises:
   querying a second MMSC on said foreign network for one or more multimedia-messaging parameters for said recipient.

3. The computer-implemented method of claim 2, wherein said multimedia-messaging parameters include said recipient's subscription parameters and said recipient's mobile device parameters.

4. The computer-implemented method of claim 3, wherein modifying one or more multimedia objects in said MMS message includes transcoding said one or more multimedia objects.

5. The computer-readable method of claim 1, wherein the multimedia-messaging parameters include one or more of a maximum file size, a display size, a display resolution, a file format, a maximum data transfer amount, subscription details, and one or more parameters of said foreign network.

6. One or more non-transitory computer-readable media storing computer-executable instruction for performing a computer-implemented method for delivering a multimedia messaging service (MMS) message from a first multimedia messaging service center (MMSC) of a home network to a second MMSC of a foreign network, the method comprising:
   modifying, at the first MMSC, one or more of the MMS message and one or more multimedia objects contained in the MMS message to conform to the one or more multimedia-messaging parameters to provide a modified multimedia message;
   communicating the modified MMS message to a second MMSC for delivery to a recipient's mobile device;
   receiving a first failed-delivery notification from the second MMSC when the modified MMS message cannot be delivered to the recipient's mobile device; and
   communicating a second failed-delivery notification to a user's mobile device, wherein the first or second failed-delivery notifications include a condition associated with the foreign network or the recipient's mobile device and the condition is selected from the group comprising: the recipient's mobile device is powered off, the recipient's mobile device is not accepting MMS messages, the recipient's mobile device has exceeded its memory capacity, or the foreign network conditions make delivery impossible.

7. The computer-implemented media of claim 6, wherein modifying the one or more of the MMS message further comprises:
   querying a second MMSC on said foreign network for one or more multimedia-messaging parameters for said recipient.

8. The computer-implemented media of claim 7, wherein said multimedia-messaging parameters include said recipient's subscription parameters and said recipient's mobile device parameters.

9. The computer-implemented media of claim 7, wherein modifying one or more multimedia objects in said MMS message includes transcoding said one or more multimedia objects.

10. The computer-readable media of claim 6, wherein the multimedia-messaging parameters include one or more of a maximum file size, a display size, a display resolution, a file format, a maximum data transfer amount, subscription details, and one or more parameters of said foreign network.

11. A system for delivering a multimedia message from a user of a first network having a multimedia messaging service center, wherein the message is destined to a recipient on a second network, the multimedia messaging service center comprising:
   a message-receiving component configured to receive an outgoing multimedia message from said user and to determine whether said recipient on said second network is on a foreign network;
   when said second network is identified as the foreign network by the message-receiving component, executing the following components:
      a querying component configured to query a multimedia messaging service center (MMSC) of said second network for one or more multimedia-messaging parameters of said recipient;
      a modifying component configured to modify one or more of said outgoing message and one or more multimedia objects contained in said multimedia message to conform to said multimedia-messaging parameters;
      a communicating component configured to communicate a modified multimedia message to said MMSC of said second network for delivery to said recipient;
   when said second network is identified as a home network of said user and recipient by the message-receiving component, executing the following component:
      a communicating component configured to communicate said outgoing multimedia message to said second network for delivery to said recipient,
   when said second network is identified as the foreign network by the message-receiving component, executing the following component:
      a notification-receiving component configured to receive a failed-delivery notification from said MMSC of said second network that delivery of a multimedia message to said recipient by said MMSC failed, wherein said failed-delivery notification from said MMSC of said second network includes a reason for the failed delivery and the reason is selected from the group comprising: the recipient's mobile device is powered off, the recipient's mobile device is not accepting MMS messages, the recipient's mobile device has exceeded its memory capacity, or the foreign network conditions make delivery impossible.

12. The system of claim 11, wherein when said second network is identified as the foreign network by the message-receiving component, executing the following component:
a notifying component configured to communicate a notification to said user indicating that said delivery of said multimedia message to said recipient failed.

13. The system of claim 11, wherein the multimedia-messaging parameters are stored in a database at said MMSC of said second network and include one or more of a maximum file size, a display size, a display resolution, a file format, a maximum data transfer amount, and subscription details.

* * * * *